United States Patent [19]

Nakayama

[11] Patent Number: 4,840,333
[45] Date of Patent: Jun. 20, 1989

[54] DEVICE FOR FASTENING BAR-LIKE OBJECTS

[75] Inventor: Hiromichi Nakayama, Toyota, Japan

[73] Assignee: Nifco, Inc., Yokohama, Japan

[21] Appl. No.: 244,764

[22] Filed: Sep. 15, 1988

[30] Foreign Application Priority Data

Sep. 21, 1987 [JP] Japan ............................ 62-144703[U]

[51] Int. Cl.⁴ .............................................. F16L 3/22
[52] U.S. Cl. ..................................... 248/68.1; 248/73
[58] Field of Search ................. 248/49, 65, 67.5, 68.1, 248/71, 73, 74.1, 74.2, 74.4, 74.5, 507, 508; 24/16 R, 17 B, 20 TT, 20 S, 457, 458, 487; 174/154

[56] References Cited

U.S. PATENT DOCUMENTS

| | | | |
|---|---|---|---|
| 2,497,039 | 2/1950 | Weimer | 174/154 |
| 2,650,948 | 9/1953 | Findlay | 248/68.1 |
| 3,182,939 | 5/1965 | Seckerson | 248/73 |
| 3,369,785 | 2/1968 | Moore | 248/68.1 |
| 3,387,343 | 6/1968 | Fitz-Gerald | 248/68.1 |
| 3,894,706 | 7/1975 | Mizusawa | 248/74.2 |
| 3,954,238 | 5/1976 | Nivet | 248/68.1 |
| 4,467,988 | 8/1984 | Kraus | 248/68.1 |
| 4,541,602 | 9/1985 | Potzas | 248/68.1 |
| 4,550,891 | 11/1985 | Schaty | 248/68.1 |
| 4,655,424 | 4/1987 | Oshida | 248/73 |
| 4,769,985 | 9/1988 | Moritz | 248/49 |

FOREIGN PATENT DOCUMENTS

| | | | |
|---|---|---|---|
| 88203 | 9/1983 | European Pat. Off. | 248/68.1 |
| 3236981 | 4/1984 | Fed. Rep. of Germany | 248/68.1 |
| 3236982 | 4/1984 | Fed. Rep. of Germany | 248/68.1 |
| 1002728 | 11/1951 | France | 248/71 |
| 44084 | 3/1980 | Japan | 248/68.1 |
| 268497 | 4/1927 | United Kingdom | 248/71 |

Primary Examiner—Ramon O. Ramirez
Assistant Examiner—Robert A. Olson
Attorney, Agent, or Firm—Schwartz & Weinrieb

[57] ABSTRACT

A device for fastening bar-like objects upon a mounting surface as a result of being mounted upon a stud projecting downwardly from the mounting surface includes a body having a holding section for holding a bar-like object and a stud insertion hole which extends in a direction substantially perpendicular to the longitudinal direction of the bar-like object and which has a locking shoulder portion upon an inner wall thereof, and a belt like holding sheet provided around the body and having at least one end portion capable of being inserted through the stud insertion hole along an inner wall surface thereof. The end portion of the holding sheet is provided with a first locking pawl extending toward the inner wall surface of the hole and capable of being locked with the locking shoulder portion and is also provided with a second locking pawl extending toward the center of the stud insertion hole and locked against movement in the direction of detachment by means of a threaded portion of the stud inserted within the stud insertion hole.

20 Claims, 4 Drawing Sheets

DEVICE FOR FASTENING BAR-LIKE OBJECTS

FIELD OF THE INVENTION

This invention relates to a device for fastening bar-like objects and, more particularly, to a device for fastening bar-like objects, wich serves to hold bar-like objects, such as for example, pipes and bundled wires, fastened to it and which is adapted to be a stud projecting from a mounting surface of an automobile body or the like.

DESCRIPTION OF THE PRIOR ART

In automobiles, various pipes and bundled wires are disposed upon interior and exterior surfaces of the automobile body.

Particularly, fuel pipes, brake pipes, or the like are disposed on the outer surface of the lower surface of the automobile body. Therefore, in order to prevent noise generation or deformation of these objects due to vibration, they re secured in positions slightly spaced apart from the automobile body by means of suitable fasteners or the like.

A fastener which is used to this end is made of a plastic material or the like, and holds various pipes or the like (hereinafter referred to as a result of being as mounted upon a stud secured by means of welding to the automobile body.

FIG. 7 shows an example of a prior art device 10 for fstening bar-like objects, that is, a device which holds bar-like objects 3, so that the same can be mounted upon a threaded stud 2 projecting downwardly from an automobile body 1.

The device 10 for fastening or securing the bar-like objects comprises a one-piece molding of a plastic material. It has two holding sections provided upon opposite sides of a central portion thereof, and wherein each holding section comprises two holding groves 11 having an arcuate sectional profile, and it also has a stud inserion hole 12 extending downwardly throught central portion thereof.

The inner periphery 12a of the hole 12 is provided with a pawl 13 or the like to be meshed with the thread of the stud 2. After the bar-like objects 3 have been inserted and fastened within the holding grooves 11, the stud insertion hole 12 is mounted on the stud 2 by raising the device 10, whereby the bar-like objects 3 are fastened to the automobile body 1.

However, this device 10 for fastening bar-like objects is inserted and mounted upon the stud 2. Therefore, if the mechanical strength of the fitting is low, although the device 10 can be easily mounted, the device 10 is liable to become accidentally detached. If the mechanical strength of the fitting is strong, although accidental detachment does not take place, a hammer or other special tool is necessary for acheiving the fastener mounting, so that the operability is extremely low, difficult, and time consuming Futhermore, with the bar-like object fastener consisting of a one-piece plastic molding, the peripheries of the holding sections have low mechanical strength and are liable to be cracked when struck by stones or other objects thrown up from the road surface by means of the vehicle tires.

OBJECT OF THE INVENTION

An object of the invention is to provide a device for fastening bar-like objects which can be readily mounted with a high degree of mechanical strength upon a stud and is safe from being broken when struck by means of stone or like thrown up from the road surface.

SUMMARY OF THE INVENTIONS

According to the invention, there is provided a device for fastening bar-like objects upon a mounting surface by means of a stud projecting from the mounting surface, comprising: a body consisting of a one-piece molding having a holding section for holding a bar-like object and a stud insertion hole extending in a direction substantially perpendicular to the longitudinal direction of the bar-like object fastened within the device and having a locking shoulder dportion defined upon an inner wall of the stud insertion hole; and a belt like holding sheet provided around the body and having at least one end portion capable of being inserted through the stud insertion hole along an inner wall surface thereof, the end prrtion of the holding sheet being provided with a first locking pawl extending toward the inner wall surface of the stud insertion hole and capable of being locked to the locking shoulder portion thereof and a second locking pawl extending toward the center of the stud insertion hole and locked against movement in the direction of detachment by means of a threaded portion of the stud inserted within the stud insertion hole.

Thus, by holding the bar-like objects within the holding section of the body, inserting the end portion of the holding sheet into the stud insertion hole so as to lock the first locking pawl with respect to the locking shoulder portion of the body and fitting the stud insertion hole in this state upon the stud projecting downwardly from the mounting surface, the second locking pawl is locked with the threaded portion of the stud so as to prevent movement in the direction of detachment.

the device for fastening bar-like objects can be readily mounted upon the stud by merely fitting the stud insertion hole upon the stud. Thus, very high mechanical mounting strength can be obtained. Furthermore, since the plastic body is covered by means of the holding sheet made of metal, it can be sufficiently protected against external shocks.

BRIEF DESCRIPTION OF THE DRAWINGS

The above and other objects and features of the invention will become more apparent from the following detailed description with reference to the accompanying drawings, wherein.

DETAILED DESCRIPTION OF THE PREFERRED EMBODIMENTS

Figure 1:
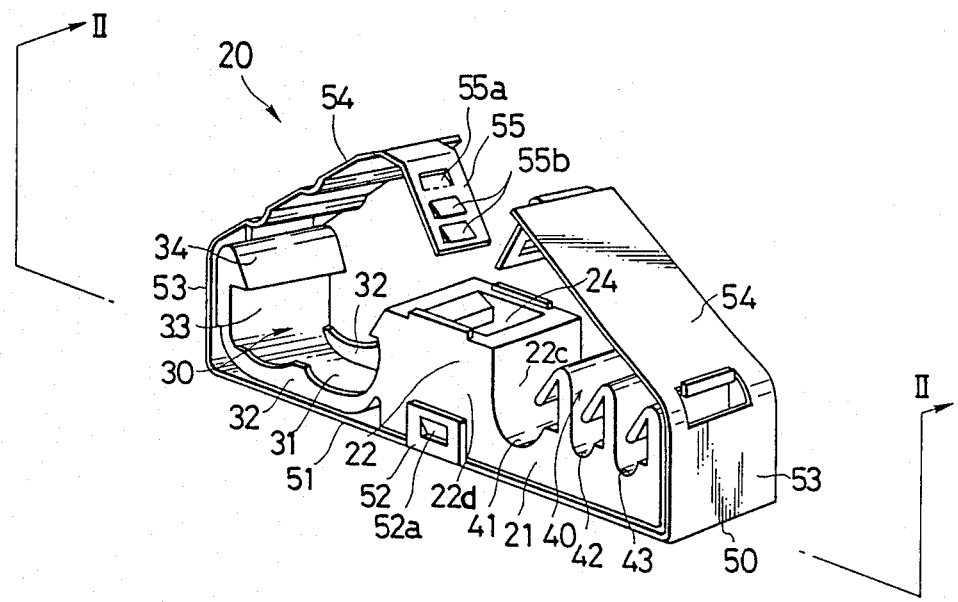
FIG. 1 is a perspective view showing an embodiment of the device for fastening bar-like objects according to the invention.
Figure 2:
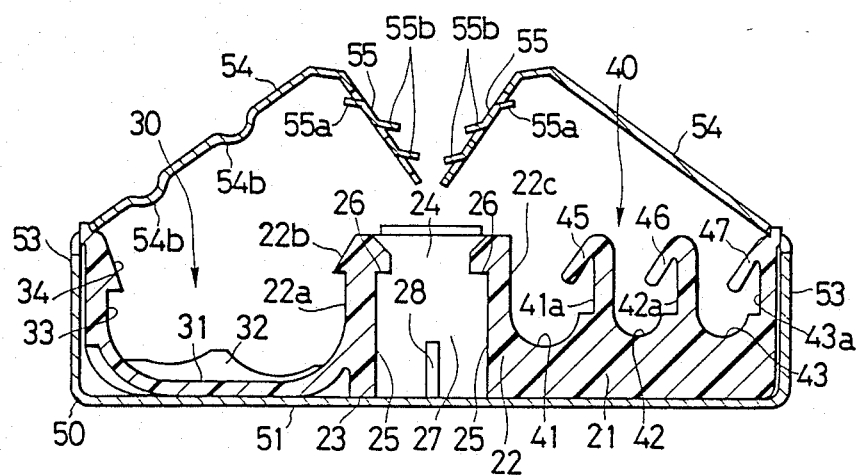
FIG. 2 is a sectional view taken along line II—II in FIG. 1.

FIGS. 1 and 2 show a first embodiment of the device for fastening bar-like objects according to the invention. The device 20 comprises a body 21 which is a one-piece plastic molding and a belt-like holder sheed 50 which is made of metal and is wrapped about the body 21.

The body 21 has a central upstanding portion 22 having a central stud insertion hole 24 penetrating the body 21 from the top to the bottom surface 23 thereof.

The inner wall surfaces 25 of the hole 24, which face each other in the longitudinal direction of the body, have respective locking shoulder portions 26 which increase in thickness in the downwardly direction extending from the top and terminate in a step like fashion with respect to the remaining wall surfaces.

The other inner wall surfaces 27 disposed perpendicular to the inner wall surfaces 25 are provided with respective rib-like guides 28 projecting toward the center of the hole 24.

Figure 3:
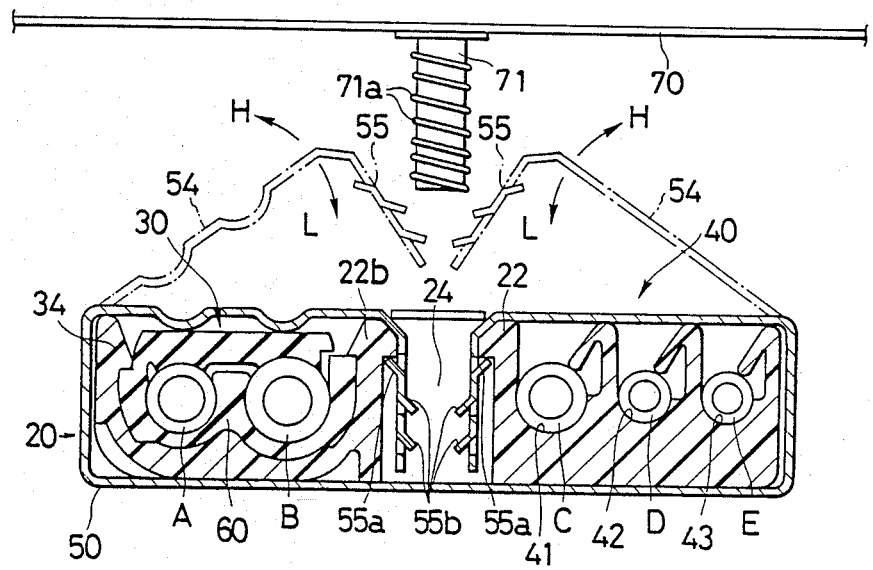
FIG. 3 is a sectional view showing the device shown in FIG. 1 and positioned so as to be mounted upon a stud, FIG. 4 (a) is a fragmentary sectional view showing the device being mounted upon the stud.

One outer surface 22a of the substantially rectangular, upstanding portion 22 is formed as a first holding section 30 having an open top portion. A vibration-proof rubber holder 60 to be described later, which supports two bar-like objects A and B laterally spaced apart at a predetermined distance from each other, is fitted within the open top portion of the first holding section 30 so as to be held within the section 30 as seen in FIG. 3.

The first holding section 30 has a bottom 31 extending from the outer surface 22a of the upstanding portion 22 and wavy support pieces 32 extending upright from the forward and rearward edges of the bottom 31 for supporting a lower portion of the rubber holder 60 which in turn supports or houses the bar-like objects A and B.

The free end of the first holding section 30 has an end wall 33 extending upright from the free end of the bottom 31. The inner wall surface of the end wall 33 is provided with a locking portion 34 extending from the top upper and thereof to an intermediate position thereof and with the thickness increasing downwardly.

The outer surface 22a of the upstanding portion 22 is also provided with a locking portion 22b projecting downwardly in an inclined mode toward the end wall 33. The lower portion and opposite sides of the rubber holder 60 (to be described later) are supported by means of the support pieces 32, and secured within section 30 by means of the locking portions 22b and 34, respectively.

The other outer surface 22c of the upstanding portion 22 is formed with a second holding section 40 for holding three bar-like objects C, D and E inserted within the open top portion thereof as is also seen from FIG. 3

The second holding section 40 has three substantially U-shaped holding grooves 41, 42, 43, provided at predetermined intervals in the laterally outward direction, the second and third holding grooves 42 and 43 having a diameter slightly smaller than that of the first holding groove 41.

The outer side walls 41a, 42a, 43a of the holding grooves 41, 42, 43 and locking portions 45, 46, 47 extending in an inclined manner downward from the top toward the groove bottom.

A belt-like holding sheet 50 made of stainless steel is disposed around the body 21 having the above structure.

The bottom 51 of the holding sheet 50 has stoppers 52 which extend upwardly from the front and rear edges of the sheet 50 at the central portion thereof and which loosely engage the front and rear side surfaces of the upstanding portion 22 of the body so as to restrict movement of the holding sheet 50 in the forward and rearward directions.

The stoppers 52 are provided with pawls 52a projecting toward the upstanding portion 22 of the body 21 and are engaged within recesses (not shown) formed within a lower portion of the front surface 22d and rear surface (not shown) of the angular cylindrical upstanding portion 22.

The holding sheet 50 has side portions 53 extending upwards along the opposite sides of the body 21 (that is , the outer sides of the first and second holding sections 30 and 40) and they have inclined portions 54 covering the top of the body 21.

The inclined portions 54 each have a locking end portion 55 extending perpendicularly from the inclined portion 54 and having a width capable of being fitted within the hole 24 of the upstanding portion 22.

The locking end portions 55 are adapted to be inserted into the hole 24 along the associated inner wall surfaces 25 when the inclined portions 54 are pushed downwardly. The locking end portions 55 each have a first locking pawl 55a which extends obliquely upwardly from the inner surface (back surface) and is adapted to be engaged with the associated locking shoulder portion 26 of the hole 24. each of the locking end portions 55 also has second locking pawls 55b extending obliquely downwardly from the opposite surface thereof facing the center of the hole 24 (front surface).

In the locked state, the first locking pawls 55a engage the locking shoulder portions 26, and the engagement can be readily released by applying a force to the outside surface of the side portions 53 of the holding sheet 50, so that the holding sheet 50 is returned to the sheet shown in FIG. 1 under its inherent elastic resilience.

Reference numeral 54b in FIG. 2 designates downwardly curved or concave/connex engagement portions for exerting a downwardly directed force the rubber holdre, 60 holding bar-like objects A and B as a result of being in contact with top of the rubber holder.

The method of use of the embodiment of the device 20 for fastening bar-like objects will now be described.

As shown in FIG. 3 two bar-like objects A and B spaced apart at a predetermined interval within the rubber holder 60 and three bar-like objects C, D and E similarly spaced apart within body 21 are inserted downwardly into the first holding section 30 and holding grooves 41 to 43 of the second holding section 40 by initially raising the inclined portions 54 of the holding sheet 50 in the directions of arrows H.

At this time, the rubber holder 60 is locked within the section of the device by the locking portion 34 of the first holding section 30 and locking portion 22b of the upstanding portion 22 and is held at a predetermined position.

Then the inclined portions 54 of the holding sheet 50 are pushed downwardly in the directions of arrows L in FIG. 3 so as to insert the locking end portions 55 into the hole 24 and engage the first locking pawls 55a with the locking shoulder portions 26.

Figure 4A:
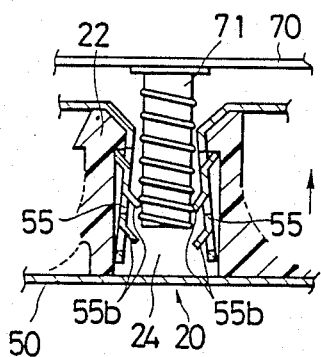
FIG. 4(b) is a fragmentary sectional view showing the device completely mounted upon the stud.

In this state, the hole 24 of the device 20 is aligned with the threaded portion 71a of a stud 71 projecting downwardly from a mounting surface 70 and the device 20 is pushed upwards as shown in FIG. 4(a).

Figure 4B:
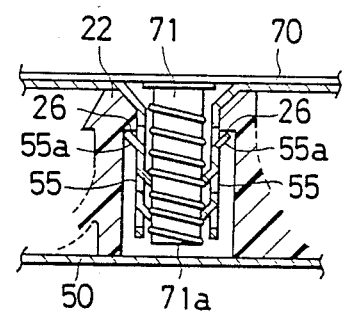

At this time, the threaded portion 71a of the stud 71 engages the second locking pawls 55b of the locking end portions 55. However, since both the direction of progress of the threaded portion 71a and the direction of projection of the second locking pawls 55b extend downwardyl the locking end portions 55 are urged against the inner walls of the hole 24, and the threaded portion 71a can proceed downwardly selative to the hole 24 without being obstructed, so that the device 20 is held eventually disposed and maintained in contact with the mounting surface 70 as shown in FIG. 4(b).

In this state, since the locking end portions 55 are biased toward the stud 71, the second locking pawls 55b are lockingly engaged with the threaded portion 71a such that it cannot be moved in the direction corresponding to the detachment of the stud 71. Furthermore, the first locking pawls 55a are securely locked with the locking shoulder portions 26 by as a result or being urged radially outwardly by means of the stud 71.

In order to remove the device 20 from the stud 71, a force equivalent to the force required for deforming the second locking pawls 55b is necessary. The device 20 is therefore mounted upon the stud 71 with a very high degree of mechanical strength.

Figure 5:
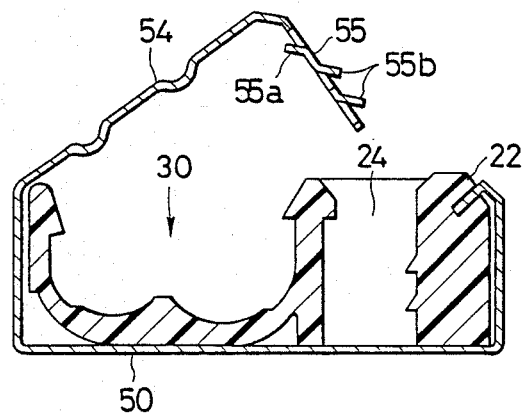
FIG. 5 is a sectional view showing a second embodiment of the divice for fastening bar-like objects according to the invention.

While in the above embodiment, the first and second holding sections 30 and 40 are provided upon opposite sides of the hole 24, it is possible to provide only a single holding section 30 upon one side of the hole 24 as shown in FIG. 5. Furthermore, it is possible to provide first and second locking pawls 55a and 55b upon only one locking end portion 55 of the holding sheet 50.

Figure 6:
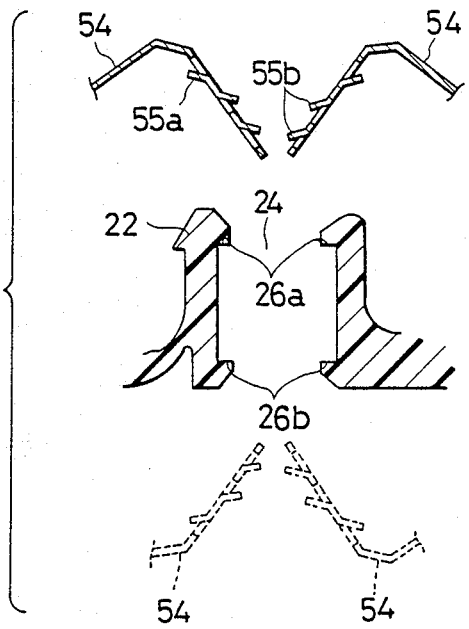
FIG. 6 is a fragmentary sectional view showing a third embodiment of the device for fastening bar-like objects according to the invention.
Figure 7:
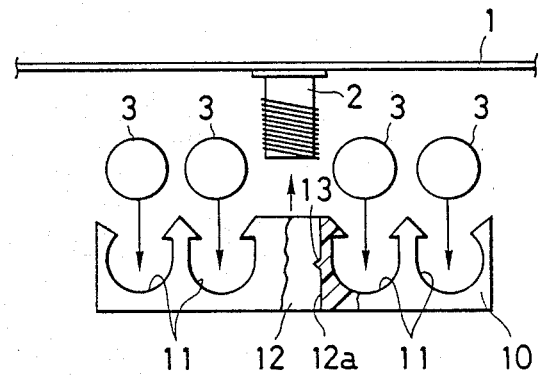
FIG. 7 is a front view, partly in section, showing prior art example of the device for fastening bar-like objects upon a mounting stud.

Still further, the shape of the hole 24 is not limited to that shown in the above embodiment. For example, as shown in FIG. 6, the upper and lower ends of hole 24 may be formed with symmetrical locking shoulder portions 26a and 26b so as to permit free selection of the direction of movement of the locking end portions 55 of sheet 50 for retaining the bar-like objects.

In this embodiment, the vibration-proof rubber holder is used to hold bar-like objects, but it is possible to configure the shape of the holding section per. se. so as to suit the bar-like objects to be retained.

Since the device for fastening bar-like objects according to the invention is constructed as described above, it can be readily mounted upon the stud without requiring the use of any particular tool. Furthermore, a very high degree of strength against detachment can be provided.

Furthermore, since the outer periphery of the fastener body is wrapped by means of the metal holding sheet, it is safe from being cracked by external impact or shock forces.

Obviously, many modifications and variations of the present invention are possible in light of the above teachings. It is therefore to be understood that within the scope of the appended claims, the present invention may be practiced otherwise than as specifically described herein.

What is claimed is:

1. A device for fastening bar-like objects upon a mounting surface having a stud projecting from said mounting surface, comprising:
    a body comprising a one-piece molding, having a holding section for holding a bar-like object and a stud insertion hole extending in a direction substantially perpendicular to the longitudinal direction of the bar-like object fastened thereto, and having a locking shoulder portion defined upon an inner wall surface of said stud insertion hole; and
    a belt-like holding sheet disposed around said body and having at least one portion thereof capable of being inserted through said stud insertion hole along said inner wall surface thereof, said at least one end portion being provided with a first locking pawl extending toward said inner wall surface of said stud insertion hole and capable of being locked to said locking shoulder portion of said stud insertion hole, and a second locking pawl extending toward the center of said stud insertion hole for engagement with a threaded portion of said stud to be inserted within said stud insertion hole so as to prevent detachment of said device from said stud.

2. A device as set forth in claim 1, wherein:
said one-piece molding body is fabricated from a plastic material.

3. A device as set forth in claim 1, further comprising:
a locking shoulder portion defined upon opposite axial ends of said stud insertion hole whereby said one end portion of said belt-like holding sheet can be selectively engaged with either locking shoulder portion of said stud insertion hole.

4. A device as set forth in claim 1, wherein:
said holding sheet is fabricated from a metal material.

5. A device as set forth in claim 4 wherein:
said metal material comprises stainless steel.

6. A device as set forth in claim 1, wherein:
said body has a predetermined lateral extent; and
said stud insertion hole is defined within one lateral end portion of said body.

7. a device as set forth in claim 6, wherein:
one end portion of said belt-like holding sheet is disposed within said stud insertion hole; and
a second end portion of said belt-like holding sheet is secured within an exterior wall portion of said body which defines one side of said stud insertion hole.

8. a device as set forth in claim 1, wherein:
said body has a predetermined lateral extent; and
said stud insertion hole is defined within a central portion of said body as viewed along said lateral extent.

9. A device as set forth in claim 8, wherein:
said belt-like holding sheet has two end portions thereof which are capable of being disposed within said centrally located stud insertion hole.

10. A device as set forth in claim 9, further comprising:
a locking shoulder portion defined upon opposite inner wall surfaces of said stud insertion hole; and
both of said two end portions of said belt-like holding sheet are provided with a first locking pawl for lockingly engaging one of said locking shoulder portions of said inner wall surfaces of said stud insertion hole, and a second locking pawl for locking engagement with said threaded portion of said stud.

11. A device as set forth in claim 8, further comprising:
an upstanding receptacle portion extending upwardly from a base portion of said body and within which said stud insertion hole is defined.

12. A device as set forth in claim 11, wherein:

said upstanding receptacle portion has the configuration of a rectangular parallelepiped.

13. A device as set forth in claim 11, wherein:

said holding section comprises a first holding section disposed upon one side of said centrally located stud insertion hole, and a second holding section disposed upon the other side of said centrally located stud insertion hole.

14. A device as set forth in claim 13, wherein:

said base portion of said body comprises concave receptacle portions for housing a plurality of bar-like objects.

15. A device as set forth in claim 14, wherein:

said first holding section comprises three concave receptacle portions for housing three bar-like objects; and said second holding section comprises two concave receptacle portions for housing two bar-like objects.

16. A system for mounting bar-like objects upon a mounting surface, comprising:

a stud projecting outwardly from said mounting surface;

a body having a holding section for holding at least one bar-like object; means defining a stud insertion hole, extending in a direction substantially perpendicular to the longitudinal extent of said at least one bar-like object held therein, for receiving and housing said stud when said body is mounted upon said stud and said mounting surface; and at least one locking shoulder portion defined upon an inner wall surface of said means defining said stud insertion hole; and a belt-like holding sheet disposed about said body and having at least one end portion thereof capable of being inserted through said stud insertion hole along said inner wall surface thereof, a first locking pawl mounted upon said at least one end portion of said belt-like holding sheet and extending toward said inner wall surface of said stud insertion hole for lockingly engaging said at least one locking shoulder portion of said stud insertion hole, and a second locking pawl extending toward the center of said stud insertion hole for engagement with a threaded portion of said stud when said stud is disposed within said stud insertion hole as a result of said body being mounted upon said stud and said mounting surface so as to prevent detachment of said device from said stud and said mounting surface.

17. A device as set forth in claim 16, wherein:

said body has a predetermined lateral extent;

said stud insertion hole is defined within a central portion of said body as viewed along said lateral extent; and said belt-like holding sheet comprises two end portions which are capable of being disposed within said centrally located stud insertion hole.

18. A system as set forth in claim 17, wherein:

said holding section comprises a first holding section disposed upon one side of said centrally located stud insertion hole for housing a plurality of bar-like objects, and a second holding section disposed upon the other side of said stud insertion hole for housing a plurality of bar-like objects.

19. A system as set forth in claim 16, wherein:

said body has a predetermined lateral extent; said stud insertion hole is defined within one lateral end portion of said body; and one end portion of said belt-like holding sheet is disposed within said stud insertion hole while a second end portion of said belt-like holding sheet is fixedly secured within an exterior wall portion of said body which defines one side of said means defining said stud insertion hole.

20. A system as set forth in claim 16, further comprising:

a locking shoulder portion defined upon opposite axial ends of said stud insertion hole whereby said at least one end portion of said belt-like holding sheet can be selectively engaged with either locking shoulder portion of said stud insertion hole.

* * * * *